US012210549B2

(12) United States Patent
Burd et al.

(10) Patent No.: US 12,210,549 B2
(45) Date of Patent: Jan. 28, 2025

(54) RECOGNIZING POLLING QUESTIONS FROM A CONFERENCE CALL DISCUSSION

(71) Applicant: Google LLC, Mountain View, CA (US)

(72) Inventors: Emily Burd, New York, NY (US); Akshat Sharma, Cambridge, MA (US)

(73) Assignee: Google LLC, Mountain View, CA (US)

( * ) Notice: Subject to any disclaimer, the term of this patent is extended or adjusted under 35 U.S.C. 154(b) by 177 days.

(21) Appl. No.: 17/211,711

(22) Filed: Mar. 24, 2021

(65) Prior Publication Data

US 2021/0406292 A1 Dec. 30, 2021

Related U.S. Application Data

(60) Provisional application No. 63/046,240, filed on Jun. 30, 2020.

(51) Int. Cl.
*G06F 16/332* (2019.01)
*G06N 20/00* (2019.01)
*G10L 15/06* (2013.01)
*G10L 15/26* (2006.01)
*H04L 12/18* (2006.01)
*H04M 3/56* (2006.01)

(52) U.S. Cl.
CPC ......... *G06F 16/3329* (2019.01); *G06N 20/00* (2019.01); *G10L 15/063* (2013.01); *G10L 15/26* (2013.01); *H04L 12/1831* (2013.01); *H04M 3/567* (2013.01)

(58) Field of Classification Search
CPC ... G06F 16/3329; G06N 20/00; G10L 15/063; G10L 15/26; H04L 12/1831; H04M 3/567
See application file for complete search history.

(56) References Cited

U.S. PATENT DOCUMENTS

| 6,581,071 B1 | 6/2003 | Gustman et al. |
| 10,176,808 B1 | 1/2019 | Lovitt et al. |

(Continued)

FOREIGN PATENT DOCUMENTS

| JP | H09281991 A | 10/1997 |
| WO | 2022006144 A2 | 1/2022 |

OTHER PUBLICATIONS

PCT International Search Report and Written Opinion for International Application No. PCT/US2021/039668 mailed Jan. 20, 2022, 20 pages.

(Continued)

*Primary Examiner* — Anne L Thomas-Homescu
(74) *Attorney, Agent, or Firm* — Lowenstein Sandler LLP

(57) ABSTRACT

Systems and methods for recognizing polling questions from a conference call discussion are provided. One or more text strings including a textual form of one or more verbal phrases provided by one or more participants of a conference call are identified. The one or more text strings are provided as input to a trained machine learning model. One or more outputs from the trained machine learning model are obtained. A level of confidence that a verbal phrase of the one or more verbal phrase provided by the one or more participants includes a question associated with polling during the conference call is extracted from the one or more outputs. In response to a determination that the level of confidence satisfies a confidence criterion, the verbal phrase is designated as a polling question presented during the conference call.

20 Claims, 10 Drawing Sheets

(56) References Cited

U.S. PATENT DOCUMENTS

| | | | |
|---|---|---|---|
| 10,424,297 B1 | 9/2019 | Carino | |
| 10,452,652 B2* | 10/2019 | Hernandez Sanchez | ..................... G06F 16/245 |
| 11,250,857 B1* | 2/2022 | Kim | ..................... G10L 15/22 |
| 11,314,761 B1* | 4/2022 | Yestrau | ................. G06F 3/0482 |
| 11,328,796 B1* | 5/2022 | Jain | ............................ G06F 9/54 |
| 2002/0085030 A1* | 7/2002 | Ghani | ...................... G09B 5/00 715/751 |
| 2006/0286530 A1* | 12/2006 | Forrest | ..................... G09B 7/02 434/323 |
| 2007/0100938 A1 | 5/2007 | Bagley et al. | |
| 2008/0120101 A1 | 5/2008 | Johnson et al. | |
| 2008/0146342 A1 | 6/2008 | Harvey et al. | |
| 2011/0231226 A1 | 9/2011 | Golden | |
| 2011/0271204 A1 | 11/2011 | Jones et al. | |
| 2013/0166279 A1 | 6/2013 | Dines et al. | |
| 2014/0229866 A1 | 8/2014 | Gottlieb | |
| 2015/0206156 A1 | 7/2015 | Tryfon et al. | |
| 2016/0044226 A1 | 2/2016 | Williams | |
| 2016/0078458 A1 | 3/2016 | Gold et al. | |
| 2017/0004515 A1 | 1/2017 | Wilmot et al. | |
| 2018/0122256 A1 | 5/2018 | Smith et al. | |
| 2018/0189382 A1* | 7/2018 | Mowatt | ............. G06Q 30/0214 |
| 2018/0232752 A1* | 8/2018 | BaderEddin | .......... H04M 3/563 |
| 2018/0359530 A1 | 12/2018 | Marlow et al. | |
| 2019/0073348 A1* | 3/2019 | Cheesman | ........... G06V 30/412 |
| 2019/0088153 A1 | 3/2019 | Bader-Natal et al. | |
| 2019/0124128 A1* | 4/2019 | Bader-Natal | ........ H04L 65/4038 |
| 2020/0042916 A1 | 2/2020 | Jaiswal et al. | |
| 2020/0074294 A1* | 3/2020 | Long | ..................... G06N 3/0445 |
| 2020/0074873 A1 | 3/2020 | Alsarhan et al. | |
| 2020/0334697 A1* | 10/2020 | BaderEddin | ............ G06F 40/20 |
| 2020/0380468 A1 | 12/2020 | Crawford et al. | |
| 2021/0377063 A1 | 1/2021 | Cutler et al. | |
| 2021/0150155 A1* | 5/2021 | Kim | ........................ H04L 51/02 |
| 2021/0150385 A1* | 5/2021 | Mallette | .............. G06F 16/3329 |
| 2021/0191925 A1* | 6/2021 | Sianez | ................... G06N 20/00 |
| 2021/0279622 A1* | 9/2021 | Bui | ......................... G06N 20/00 |
| 2022/0114142 A1* | 4/2022 | Madisetti | .............. G06F 16/176 |
| 2022/0138470 A1 | 5/2022 | Seleskerov et al. | |
| 2024/0079000 A1* | 3/2024 | Fernández Musoles | .................... G06F 16/345 |

OTHER PUBLICATIONS

Grosvenor, Carrie, "Family Feud: The Rules of the Game", Sep. 25, 2018, liveabout, retrieved on Oct. 22, 2021, retrieved from <https://www.liveabout.com/family-feud-brief-overview-1396911 >, pp. 1-3 (Year: 2018).

Heinrich, Steve, "Quiplash: New Party Game Expands Audience Participation to 10, 1000", Jun. 30, 2015, PlayStation Blog, V retrieved on Oct. 22, 2021, retrieved from <https://blog.playstation.com/2015/06/30/quiplash-new-party-game-expands-audience-participation-to-10000/>, pp. 1-4 (Year: 2015).

PCT International Search Report and Written Opinion for International Application No. PCT/US2022/041592 mailed Mar. 16, 2023, 23 pages.

Extended European Search Report Serial No. EP 23 20 8880, dated Jan. 15, 2024, 7 pages.

PCT International Search Report and Written Opinion for International Application No. PCT/US2021/041412 mailed Dec. 9, 2022, 17 pages.

* cited by examiner

RECOGNIZING POLLING QUESTIONS FROM A CONFERENCE CALL DISCUSSION

RELATED APPLICATIONS

This non-provisional application claims priority to U.S. Provisional Patent Application No. 63/046,240 filed on Jun. 30, 2020 and entitled "RECOGNIZING POLLING QUESTIONS FROM A CONFERENCE CALL DISCUSSION," which is incorporated by reference herein.

TECHNICAL FIELD

Aspects and implementations of the present disclosure relate to recognizing polling questions from a conference call discussion.

BACKGROUND

Video or audio-based conference call discussions can take place between multiple participants via a conference platform. A conference platform includes tools that allow multiple client devices to be connected over a network and share each other's audio data (e.g., voice of a user recorded via a microphone of a client device) and/or video data (e.g., a video captured by a camera of a client device, or video captured from a screen image of the client device) for efficient communication. A conference platform can also include tools to allow a participant of a conference call to pose a question to other participants (e.g., via a conference platform user interface (UI)) during the conference call discussion to solicit responses (referred to as polling). The conference platform can collect responses provided by the other participants and generate polling results.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed for designating a verbal phrase presented during a conference call as a polling question. In an implementation, one or more text strings including a textual form of one or more verbal phrases provided by one or more participants of a conference call are identified. The one or more text strings are provided as input to a trained machine learning model. One or more outputs from the trained machine learning model are obtained. A level of confidence that a verbal phrase of the one or more verbal phrase provided by the one or more participants includes a question associated with polling during the conference call is extracted from the one or more outputs. In response to a determination that the level of confidence satisfies a confidence criterion, the verbal phrase is designated as a polling question presented during the conference call.

In some implementations, a system and method are disclosed for training a machine learning model to determine whether a verbal phrase provided by a participant of a conference call includes a polling question. In an implementation, training data for the machine learning model is generated. Generating the training data includes generating a training input including data corresponding to a phrase provided by a user of a platform. Generating the training data also includes generating a target output for the training input, where the target output includes an indication of whether the phrase corresponds to a question previously used for polling one or more additional users of the platform. The training data is provided to train the machine learning model on (i) a set of training inputs including the training input and (ii) a set of target outputs including the target output.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
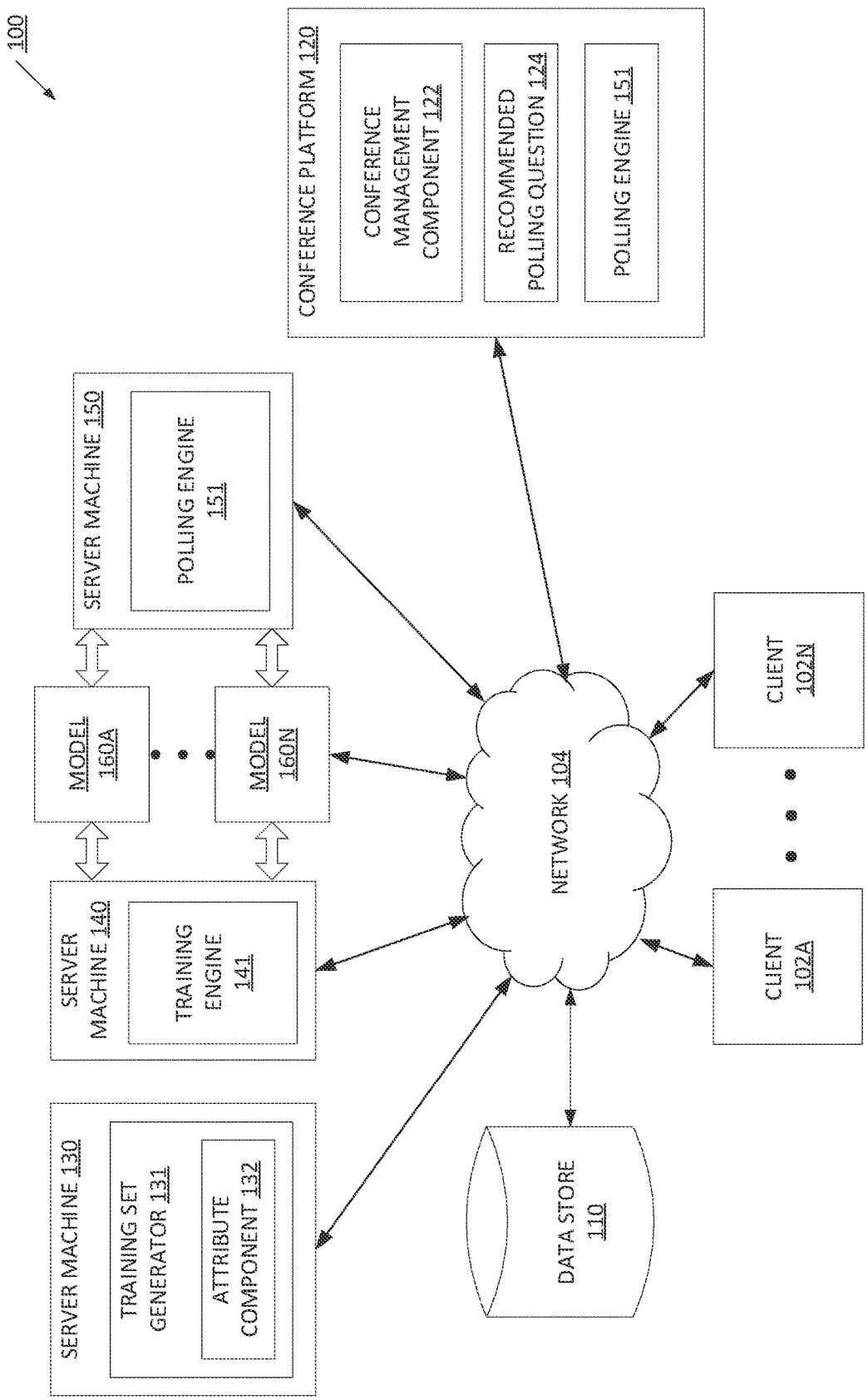
FIG. 1 illustrates an example system architecture, in accordance with implementations of the present disclosure.

Aspects of the present disclosure relate to recognizing polling questions from a conference call discussion. A conference platform can enable video or audio-based conference call discussions between multiple participants via respective client devices that are connected over a network and share each other's audio data (e.g., voice of a user recorded via a microphone of a client device) and/or video data (e.g., a video captured by a camera of a client device) during a conference call. In some instances, a conference platform can enable a significant number of client devices (e.g., up to one hundred or more client devices) to be connected via the conference call.

A participant of a conference call may want to pose a question to the other participants of the conference call to solicit responses from the other participants (referred to as polling). The participant can provide a polling question during the conference call and the conference platform can collect responses provided by other participants of the conference call. Some existing conference platforms can provide a user interface (UI) to each client device connected to the conference call, where the UI displays the video data and/or audio data shared over the network, and can also display messages exchanged between participants during the conference call. The participant that wants to pose a polling question can pose the polling question to the other participants by causing the client devices associated with the other participants to display a message based on the polling question. For example, the participant can select a polling option in the UI of the conference platform and type the polling question in a designated area of the conference platform UI at a client device. In response to receiving the polling question, the conference platform can generate a message based on the polling question and cause the message to be displayed via the conference platform UI at the client devices associated with the other participants.

Conventionally, a conference call participant that wants to pose a polling question to the other participants can think of the polling question prior to the conference call and pose the polling question via the conference platform UI at a particular instance of the discussion. However, an introduction of a pre-determined polling question during a conference call can interrupt an organization or a natural flow of the conference call discussion and can increase the length of the discussion. In some instances, a conference call participant can think of the polling question based on the discussion between participants of the conference call. To poll the other participants using the polling question, the participant can ask the other participants to pause the discussion, provide the polling question via the conference platform UI at the client device, and cause the polling question to be displayed to the other participants, as previously described. However, the process to provide the polling question via the conference platform UI and cause the polling question to be displayed to the other participants can take a significant amount of time (e.g., minutes). If multiple polling questions are posed to participants of the conference call, the length of the conference call discussion can increase significantly. Further, an organization and/or a natural flow of the conference call discussion is interrupted and participants are unable to efficiently discuss each topics for the conference call. By increasing the length of the conference call discussion, additional system resources are utilized to facilitate the connection between the client devices associated with each participant. Therefore, fewer system resources are available to other processes, both on the client devices and computing devices hosting the conference platform, reducing an overall efficiency and increasing an overall latency for the client devices and the computing devices.

Implementations of the present disclosure address the above and other deficiencies by providing a machine learning model that recognizes polling questions from a conference call discussion. The machine learning model can be trained based on phrases previously used to poll users of a platform (e.g., a conference platform, a collaboration platform, etc.). During a conference call, a conference platform can generate audio data associated with verbal phrases provided by participants of the conference call. In some embodiments, the conference platform can generate one or more text strings including the provided verbal phrases and provide the text strings as input to a trained machine learning model. In other or similar embodiments, the audio data itself (i.e., the audio recording) can be used as input to the trained machine learning model. The machine learning model can be trained to determine whether the text strings include a verbal phrase representing a question for polling participants of the conference call. In response to receiving the text strings as input, the machine learning model can provide, as an output, a level of confidence indicating a likelihood that the text strings include a verbal phrase representing a polling question. The conference platform can determine whether to designate the verbal phrase of the text strings as a polling question (e.g., based on a confidence criterion). In response to determining to designate the verbal phrase as a question for polling, the conference platform can display a message inquiring whether the participant would like to pose the question to the other participants of the conference call. The message can be displayed via a UI of a client device associated with the participant that provided the verbal phrase. In response to receiving an indication that the participant would like to pose the question to the other participants of the conference call (e.g., if the participant selects a designated checkbox), the conference platform can update the conference platform UI on client devices associated with other participants of the conference call to include a message associated with the polling question.

The machine learning model can also be used to identify polling questions and provided responses after a conference call is completed. For example, the conference platform can generate a transcript of a conference call after the conference call is completed. The conference platform can identify one or more text strings, based on the generated transcript, including verbal phrases provided by conference call participants and provide the text strings as input to the machine learning model. The machine learning model can provide, as an output, a level of confidence indicating a likelihood that text strings includes verbal phrase representing a question for polling. In response to designating a verbal phrase as a question for polling, the conference platform can identify, based on the generated transcript, one or more strings of text including verbal phrases that represent responses to the polling question. The conference platform can generate polling results based on the identified polling question and the identified responses and provide the generated polling results to a participant of the conference call (e.g., an organizer of the conference call).

Aspects of the present disclosure recognize polling questions based on verbal phrases provided during a conference call discussion. During a conference call, the conference platform can recognize polling questions provided by participants and can automatically display a message inquiring whether the participant that provided a verbal phrase would like to pose the polling question to the other participants. As such, a participant that wants to pose a polling question to the other participants does not interrupt the organization or the natural flow of the conference call by asking the other participants to pause the discussion while the participant provides the polling question via the conference platform UI. Further, as described above, verbal phrases including polling questions and responses can be identified from a transcript generated after the conference call. As such, the conference platform can recognize polling questions and responses provided during the conference call without a participant interrupting the discussion to pose the polling question and solicit responses. Thus, the participants of the conference call can efficiently conduct the conference call discussion with a reduced number of interruptions, thereby reducing the length of the conference call discussion. As a result of reducing the length of a conference call discussion, the amount of system resources utilized to facilitate the connection between client devices associated with each participant is decreased. Therefore, more system resources are available at the client devices and other computing devices for other processes, resulting in an increase of overall efficiency and a decrease in overall latency.

FIG. 1 illustrates an example system architecture 100, in accordance with implementations of the present disclosure. The system architecture 100 (also referred to as "system" herein) includes client devices 102A-N, a data store 110, a conference platform 120, and one or more server machines 130-150, each connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video data, in accordance with embodiments described herein. Data store 110 can be hosted by one or more storage devices, such as main memory, magnetic or optical storage based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by conference platform 120 or one or more different machines (e.g., server machines 130-150) coupled to the conference platform 120 via network 104.

Conference platform 120 can enable users of client devices 102A-N to connect with each other via a conference call, such as a video conference call or an audio conference call. A conference call refers to an audio-based call and/or a video-based call in which participants of the call can connect with multiple additional participants. Conference platform 120 can allow a user to join and participate in a video conference call and/or an audio conference call with other users of the platform. Although embodiments of the present disclosure refer to multiple participants (e.g., 3 or more) connecting via a conference call, it should be noted that embodiments of the present disclosure can be implemented with any number of participants connecting via the conference call (e.g., 2 or more).

The client devices 102A-N may each include computing devices such as personal computers (PCs), laptops, mobile phones, smart phones, tablet computers, netbook computers, network-connected televisions, etc. In some implementations, client devices 102A-N may also be referred to as "user devices." Each client device 102A-N can include a web browser and/or a client application (e.g., a mobile application or a desktop application). In some implementations, the web browser and/or the client application can display a user interface (UI), provided by conference platform 120, for users to access conference platform 120. For example, a user can join and participate in a video conference call or an audio conference call via a UI provided by conference platform 120 and presented by the web browser or client application.

Each client device 102A-N can include an audiovisual component that can generate audio and video data to be streamed to conference platform 120. In some implementations, the audiovisual component can include a device (e.g., a microphone) to capture an audio signal representing speech of a user and generate audio data (e.g., an audio file) based on the captured audio signal. The audiovisual component can include another device (e.g., a speaker) to output audio data to a user associated with a particular client device 102A-N. In some implementations, the audiovisual component can also include an image capture device (e.g., a camera) to capture images and generate video data of the captured data of the captured images.

In some implementations, conference platform 120 can include a conference management component 122. Conference management component 122 is configured to manage a conference call between multiple users of conference platform 120. In some implementations, conference management component 122 can provide the UI to each client device to enable users to watch and listen to each other during a conference call. Conference management component 122 can also collect and provide data associated with the conference call to each participant of the call. For example, conference management component 122 can detect a particular user that is talking during the conference call and provide a notification to each client device associated with the conference call including an identifier of the particular user. In some instances, the conference management component 122 and/or components of each respective client device 102A-N can modify the UI based on the notification.

As described previously, an audiovisual component of each client device can capture audio signals representing speech of a user and generate audio data based on the captured audio signal. For example, a participant to a conference call can provide a verbal phrase. The audiovisual component of the client device associated with the participant can capture audio signals recognizing the verbal phrase provided by the participant and generate audio data (e.g., an audio file) based on the captured audio signal. In some implementations, the client device can transmit the generated audio data to conference management component 122. Conference management component 122 can generate, based on the received audio data, one or more text strings including verbal phrases provided by the participant. For example, conference management component 122 can convert an audio file received from a client device 102A-N into a file including the one or more text strings. Conference management component 122 can store the one or more text strings, or the file including the one or more text strings, at data store 110. In some embodiments, conference management component 122 can store the audio data (e.g., the received audio file) at data store 110 as well.

In some embodiments, conference management component 122 can receive audio data at multiple instances during the conference call. For example, each instance that a participant provides a verbal phrase, the audiovisual component of the client device associated with the participant can generate audio data based on the verbal phrase and transmit the audio data to conference management component 122. As such, conference management component 122 can generate separate text strings that include each verbal phrase provided by a participant of the conference call as each verbal phrase is recorded at a respective client device. During or after completion of the conference call (e.g., after each participant of the call has ended a connection between a client device and the conference platform), conference management component can generate a transcript of the conference call based on each separate generated text string. In other or similar embodiments, conference management component 122 can receive audio data generated for each participant (e.g., from each client device 102A-N) after completion of the conference call. In such embodiments, conference management component 122 can generate text strings that include verbal phrases provided by each participant of the conference call after completion of the conference call. Each text string generated after completion of the conference call can be included in a conference call transcript stored at data store 110. In some embodiments, a conference call transcript can be generated by transcript generation module 212 of conference management component 122, as described with respect to FIG. 2.

Conference management component 122 can also enable participants of the conference call to poll other participants during the conference call. A participant can poll other participants of a conference call by posing a question to the other participants to solicit responses to the question. In some implementations, a participant can pose a question to other participants by providing the question via a UI element of the UI provided by the conference management component 122. For example, the UI provided by conference management component 122 can include a text box to enable a participant to type a question for polling and a UI element (e.g., a button) configured to enable the participant to submit the question to conference platform 120. Additionally or alternatively, the participant can verbally provide the question for polling other participants, in accordance with embodiments described herein.

A recommendation system can be configured to identify verbal phrases provided by a participant of a conference call and recommend, based on the identified verbal phrase, polling questions 124 to be posed to other participants. A recommended polling question 124 can be an indicator (e.g., interface component, electronic message, recommendation feed, etc.) that provides a user with suggestions of polling questions that could be posed to other participants of the call. For example, during a conference call, a participant can provide the verbal phrase "Does everyone agree we should move the meeting to Tuesday?" The recommendation system can determine whether the provided verbal phrase includes a question for polling the other participants of the call. The recommendation system can include at least a training set generator 131, a training engine 141, a machine learning model 160, and a polling engine 151. In some implementations, a recommended polling question 124 can be based on an output of a trained machine learning model, such as machine learning models 160A-N.

Server machine 130 can include a training set generator 131 that is capable of generating training data (e.g., a set of training inputs and a set of target outputs) to train ML models 160A-N. Training data can be generated based on phrases that have been previously provided by users of a platform for polling other users of the platform, such as conference platform 120 or other platforms included in system 100 (e.g., collaboration platform 170). A collaboration platform 170 can provide tools to enable users to collaborate with each other via messaging, documents, etc. For example, collaboration platform 170 can include a survey component 172 to enable a user to prepare surveys for polling other users of the collaboration platform 170. A user can provide (e.g., using a UI provided by the survey component 172) one or more questions to be included in the survey. In response to receiving the one or more questions, collaboration platform 170 can cause a phrase including each provided question to be stored at data store 110. In some embodiments, collaboration platform 170 can also store, for each phrase, and indication that the phrase includes a question used for polling.

As described above, data store 110 can include phrases including questions that were previously provided for polling users of a platform (e.g., conference platform 120, collaboration platform 170, etc.). For example, data store 110 can include questions previously provided by users of collaboration platform 170 for a survey, as previously described. Data store 110 can also store an indication that the phrase includes a question that was used for polling (e.g., the question was included in a survey created by a user). In some embodiments, data store 110 can also store an indication of one or more answers that were provided by users of a platform in response to the question (e.g., "yes," "no," etc.).

Training data generator 131 can generate a set of training data by identifying data corresponding to previously provided questions stored at data store 110. The set of training data can include a subset of training inputs and target output based on the identified data. The subset of training inputs can include a phrase previously provided by users of a platform (e.g., conference platform 120, collaboration platform 170, etc.). In some embodiments, the phrase can be included in a text string, as previously described. In other or similar embodiments, the phrase can be included as audio data generated by a client device 102 (e.g., an audio recording of a statement provided by a user of a platform. In some embodiments, the subset of training inputs can also include one or more attributes associated with the previously provided phrase. Training data generator 131 can include an attribute component 132 configured to obtain one or more attributes associated with each phrase at data store 110. In some embodiments, an attribute can include an indication of whether the phrase includes a question. In similar embodiments, an attribute can include a question type associated with the previously provided question. A question type can correspond with one or more answers provided in response to the question. For example, training data generator 131 can determine that a question corresponds to a "yes/no"-type question in response to determining one or more answers provided in response to the question correspond to a "yes" answer or a "no" answer. Training data generator 131 can determine that one or more answers correspond to a "yes" answer or a "no" answer by determining a context associated with each answer provided in response to the previously provided question. For example, an answer to a previously provided question can be "sure," or "okay." Training data generator 131 can determine that the previously provided question corresponds to a "yes" answer or a "no" answer by determining that a context of the answers to the question correspond with a "yes" answer. In another example training generator 131 can determine that a question corresponds to a "day of the week"-type question in response to determining one or more answers provided in response to the question correspond to a day of the week.

As described above, the set of training inputs can include an audio recording of a statement provided by a user of a platform. In such embodiments, attribute component 132 can identify one or more attributes associated for an audio recording. For example, attribute component 132 can identify, in the audio recording, a portion of the audio recording at which an inflection of a user's corresponds to a question (e.g., the user's inflection is elevated to a higher pitch). An attribute associated with the audio recording can include a timestamp associated with the identified portion of the audio recording. Attribute component 132 can also identify the attributes associated with the audio recording.

Each of the subset of target outputs of the set of training data can include data pertaining to whether a phrase includes a question that was previously used for polling. Training data generator 131 can determine whether the phrase includes a question previously used for polling based on an indication for each question stored at data store 110, in accordance with previously described embodiments.

Server machine 140 may include a training engine 141. Training engine 141 can train a machine learning model 160A-N using the training data from training set generator 131. The machine learning model 160A-N can refer to the model artifact that is created by the training engine 141 using the training data that includes training inputs and corresponding target outputs (correct answers for respective training inputs). The training engine 141 can find patterns in the training data that map the training input to the target output (the answer to be predicted), and provide the machine learning model 160A-N that captures these patterns. The machine learning model 160A-N can be composed of, e.g., a single level of linear or non-linear operations (e.g., a support vector machine (SVM or may be a deep network, i.e., a machine learning model that is composed of multiple levels of non-linear operations). An example of a deep network is a neural network with one or more hidden layers, and such a machine learning model can be trained by, for example, adjusting weights of a neural network in accordance with a backpropagation learning algorithm or the like. For convenience, the remainder of this disclosure will refer to the implementation as a neural network, even though some implementations might employ an SVM or other type of learning machine instead of, or in addition to, a neural network. In one aspect, the training set is obtained by training set generator 131 hosted by server machine 130. In some embodiments, the machine learning model 160 can be a polling question model, described with respect to FIG. 2.

Server 150 includes a polling engine 151 that provides verbal phrases provided by participants of a conference call as input to a trained machine learning model 160A-N to obtain one or more outputs. In some embodiments, the verbal phrase can be included in a text string, as previously described. In other or similar embodiments, the verbal phrase can be included in an audio recording. The model can be used to determine whether a verbal phrase provided by a participant of a conference call includes a question associated with polling. The model can provide one or more outputs indicating a likelihood (e.g., a level of confidence) that a verbal phrase provided by a user is associated with a polling question. Polling engine 151 can determine whether to recommend the verbal phrase as a polling question by determining whether a level of confidence associated with the verbal phrase satisfies a confidence criterion. In some embodiments, polling engine 151 can determine the level of confidence associated with the verbal phrase satisfies a confidence criterion by determining the level of confidence satisfies or meets a threshold level of confidence. In response to determining the confidence criterion is satisfied, polling engine 151 can designate the verbal phrase as a polling question presented during the conference call and provide the polling question as a recommended polling question 124 to conference platform 120. In some embodiments, the model can also provide one or more outputs indicating potential answers associated with the verbal phrase provided as input to the model. In response to determining the confidence criterion is satisfied, polling engine 151 can provide the potential answers to the recommended polling question 124 to conference platform 120.

In some implementations, conference platform 120, collaboration platform 170, and/or server machines 130-150, can be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a conference call. Conference platform 120 may also include a website (e.g., a webpage) or application back-end software that may be used to enable a user to connect with other users via the conference call.

It should be noted that in some other implementations, the functions of server machines 130, 140, and 150 or conference platform 120 may be provided by a fewer number of machines. For example, in some implementations server machines 130 and 140 may be integrated into a single machine, while in other implementations server machines 130, 140, and 150 may be integrated into multiple machines. In addition, in some implementations one or more of server machines 130, 140, and 150 may be integrated into conference platform 120.

In general, functions described in implementations as being performed by conference platform 120 or server machines 130, 140, 150 can also be performed on the client devices 102A-N in other implementations, if appropriate. In addition, the functionality attributed to a particular component can be performed by different or multiple components operating together. Conference platform 120 and/or server machines 130, 140, 150 can also be accessed as a service provided to other systems or devices through appropriate application programming interfaces, and thus is not limited to use in websites.

Although implementations of the disclosure are discussed in terms of conference platform 120 and users of conference platform 120 participating in a video and/or audio conference call, implementations may also be generally applied to any type of telephone call or conference call between users. Implementations of the disclosure are not limited to content sharing platforms that provide conference call tools to users.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the conference platform 120.

In situations in which the systems discussed here collect personal information about users, or may make use of personal information, the users may be provided with an opportunity to control whether conference platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the conference platform 120.

Figure 2:
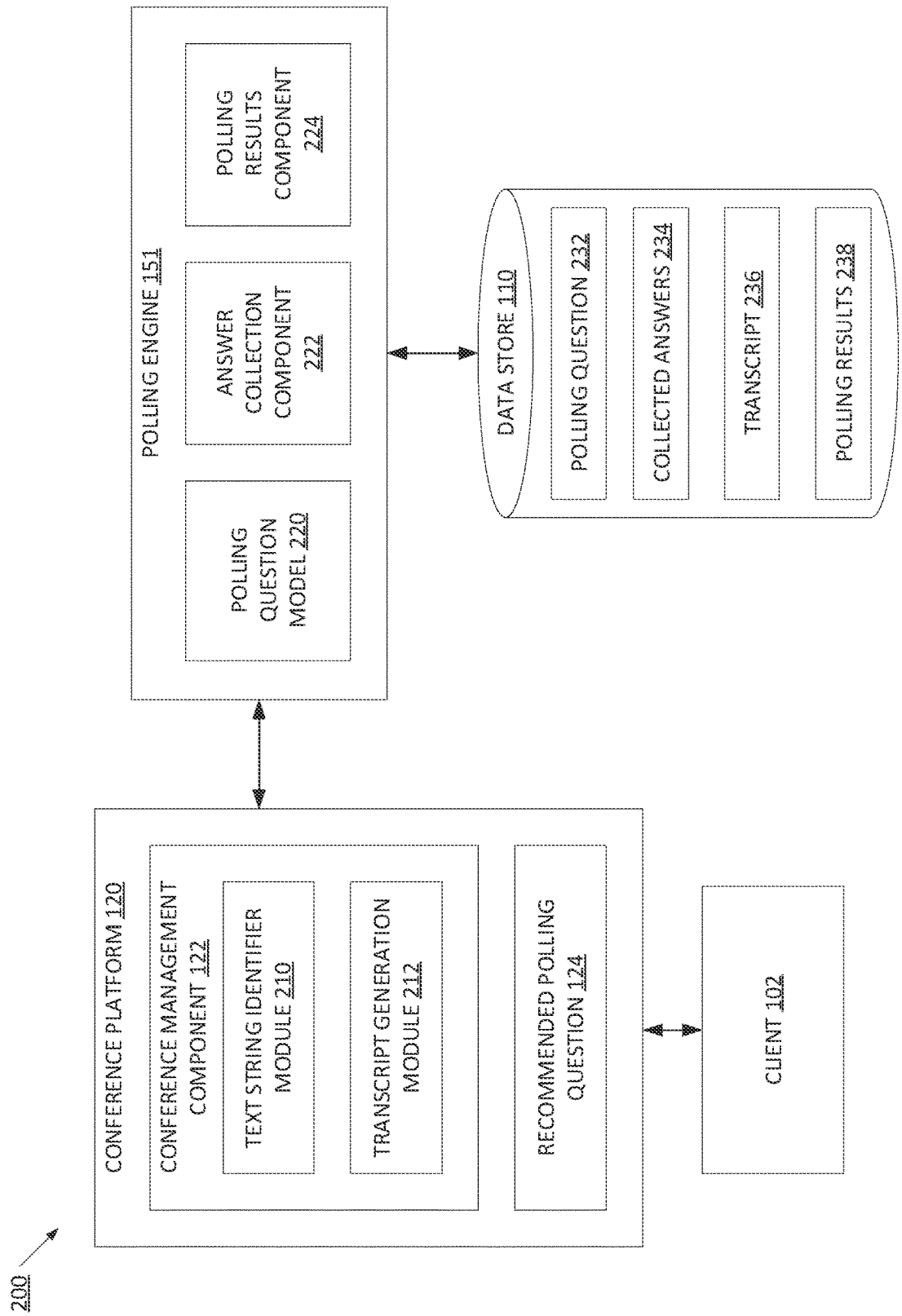
FIG. 2 is a block diagram illustrating a conference platform and a polling engine for the conference platform, in accordance with implementations of the present disclosure.

FIG. 2 is a block diagram illustrating a conference platform 120 and a polling engine 151, in accordance with implementations of the present disclosure. As described with respect to FIG. 1, conference platform 120 can provide tools to users of a client device 102 to join and participate in a video and/or audio conference call. Conference platform 120 can include a conference management component 122. Conference management component 122 can include a text string identifier module 210 and a transcript generation module 212. Polling engine 151 can facilitate polling of conference call participants. Polling engine can include a polling question model 220, an answer collection component 222, and a polling results component 214.

Figure 3A:
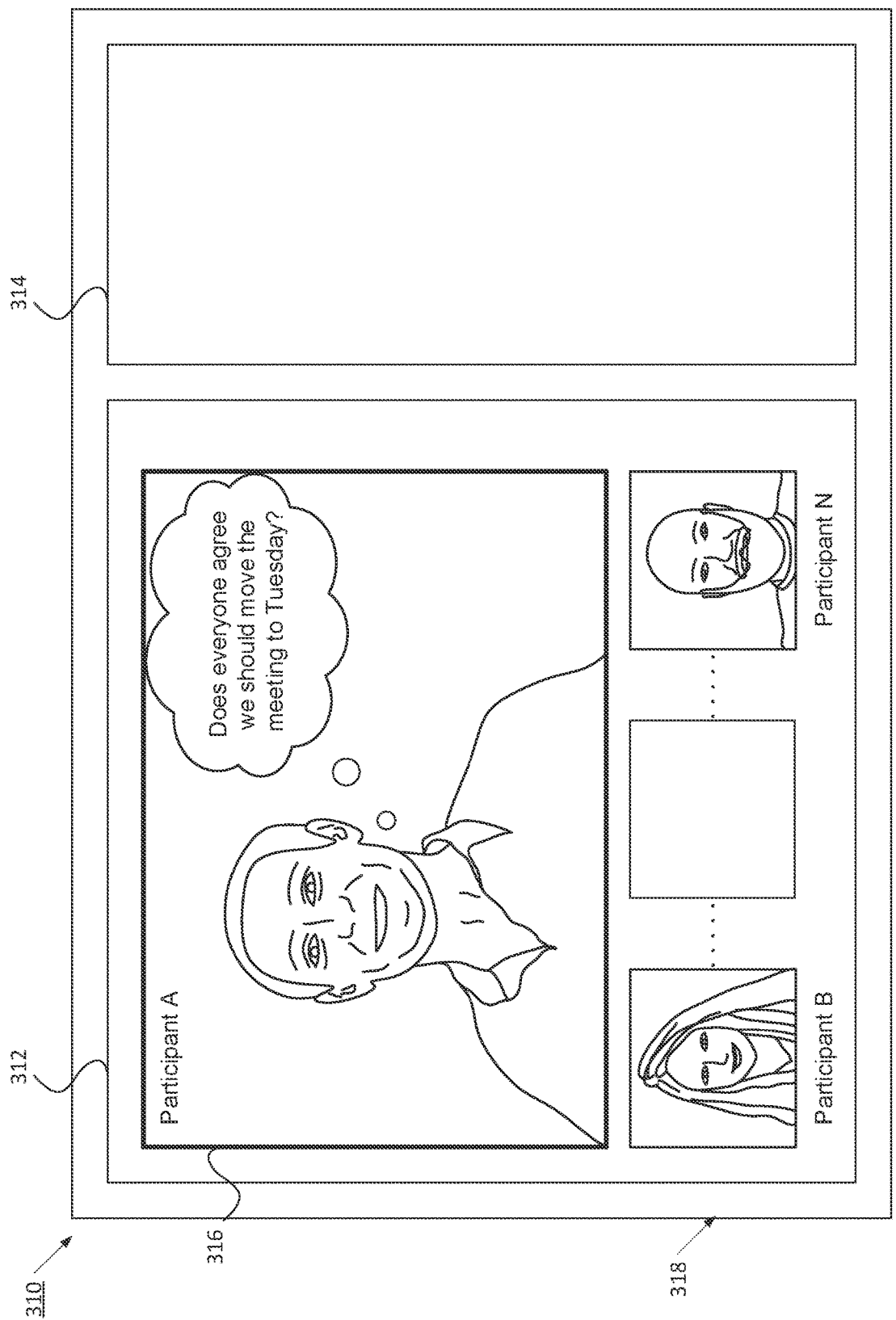
FIG. 3A illustrates recognizing a verbal phrase provided during a conference call as a polling question, in accordance with implementations of the present disclosure.

Text string identifier module 210 of conference management component 122 can identify text strings including a textual form of one or more verbal phrases provided by participants of a conference call. In some embodiments, the text strings can be identified during a conference call or based on a transcript 236 generated by transcript generation module 212 during or after completion of the conference call, in accordance with previously described embodiments. FIG. 3A illustrates a video conference call between multiple participants via conference platform 120. As illustrated, conference management component 122 provides a UI 310 to enable participants (e.g., participants A-N) to join and participate in a conference call. UI 310 is described as a UI displayed via a client device 102 associated with Participant A of the conference call. However, it should be noted that UI 310 can displayed on a client device 102 associated with any participants to the conference call.

UI 310 can include multiple sections, including a first section 312 and a second section 314. In some embodiments, the first section 312 can include one or more portions for outputting video data captured at the client devices associated with each participant. For example, the first section 312 can include at least a first portion 316 and a second portion 318 that each display video data captured by user devices associated with participants of the video conference call. In some implementations, the first portion 316 of section 312 can display video data captured by a user device associated with a participant that is providing verbal statements during the conference call (i.e., the participant that is currently speaking). In other words, the first portion 316 can display video data associated with a participant that is currently speaking. As illustrated in FIG. 3A, Participant A is providing the verbal phrase "Does everyone agree we should move the meeting to Tuesday?" As such, the first portion 316 of section 312 displays video data captured by a client device associated with Participant A. Second portion 318 of section 312 can display video data captured by client devices of participants (e.g., Participants B-N) that are not providing verbal statements during the conference call (i.e., are not currently speaking). In other or similar embodiments, section 312 can include one or more sections that are configured to display video data associated with participants in accordance with other orientations. For example, section 312 can include a single portion that displays the video data captured by client devices of a participant that is currently speaking and does not display video data captured by client devices of participants that are not currently speaking. In another example, section 312 can include multiple portions that each display video data associated with a participant of the video conference call, regardless of whether a participant is currently speaking.

As illustrated in FIG. 3A, Participant A can provide the verbal phrase "Does everyone agree we should move the meeting to Tuesday?" The audiovisual component of the client device associated with Participant A can capture an audio signal based on the verbal phrase and generate audio data (e.g., an audio file) based on the captured audio signal, in accordance with previously described embodiments. The client device can transmit the audio data to conference management component 122. In some embodiments, the client device can transmit an identifier of the participant that provided the verbal phrase with the audio data. In response to receiving the audio data, conference management component 122 can generate, based on the received audio data, one or more text strings including the verbal phrases provided by Participant A, in accordance with previously described embodiments. Text string identifier module 210 can identify the one or more text strings generated by conference management component as text strings to be provided to polling question model 220.

Figure 4A:
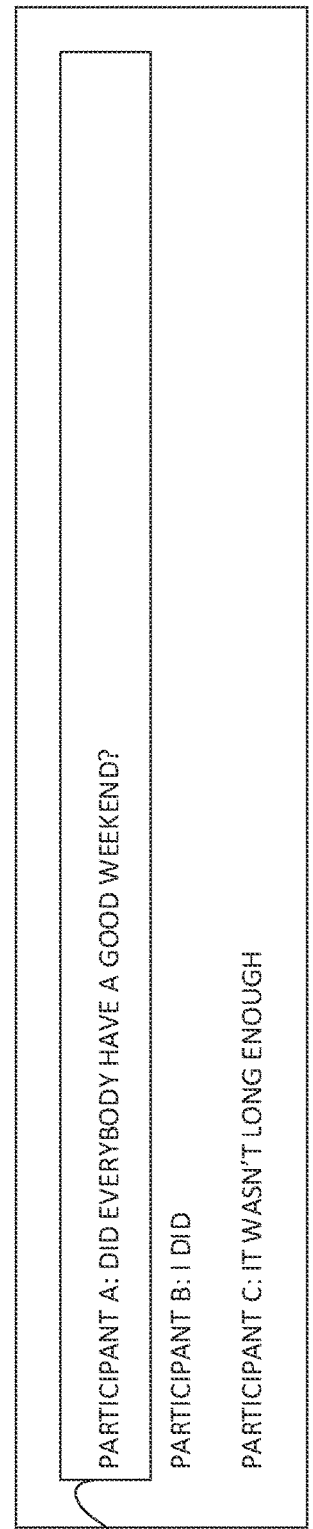
FIGS. 4A-B illustrate recognizing a verbal phrase included in a conference call transcript as a polling question, in accordance with implementations of the disclosure.
Figure 4B:
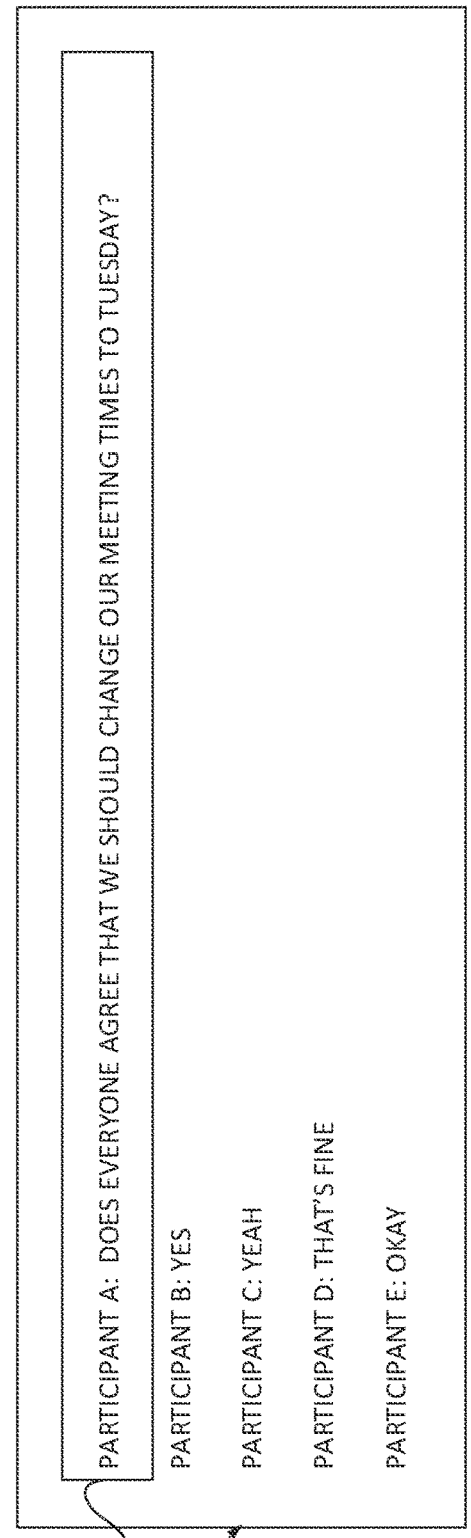

Referring back to FIG. 2, text string identifier module 210 can identify the one or more text strings to be provided to polling question model 220 based on a transcript 236 generated by transcript generation module 212, as previously described. FIGS. 4A-4B illustrate portions of transcripts generated by transcript generation module 212, in accordance with previously described embodiments. In some embodiments, text string identifier module 210 can identify a text string including a verbal phrase provided by a participant of a conference call by parsing each text string included in the generated transcript. In such embodiments, text string identifier module 210 can identify each text string of a transcript as a text string to be provided as input to polling question model 220. In other or similar embodiments, text string identifier module 210 can parse each text string included in a generated transcript and determine whether each text string includes a phrase corresponding to a question. For example, as illustrated in FIG. 4A, text string identifier module 210 can parse each text string included in transcript 410 and determine that a first text string 412 includes a phrase that corresponds to a question (e.g., "Did everybody have a good weekend?"). In response to determining a text string includes a verbal phrase corresponding to a question, text string identifier module 210 can identify the text string as a text string to be provided as input to polling question model 220.

In some embodiments, text string identifier module 210 can identify a text string including a verbal phrase corresponding to a question by identifying portions of the transcript that include one or more verbal phrases that correspond to answers to a question (e.g., yes, no, etc.). In some embodiments, text string identifier module 210 can identify text strings that correspond to answers to a question based on a previously defined list of phrases that correspond to answers to a question (e.g., stored at data store 110). For example, a previously defined list of phrases corresponding to answers can include phrases or words such as "yes," "no," or "maybe." As illustrated in FIG. 4B, a first portion 422 of transcript 420 includes a verbal phrase provided by participant B (i.e., "yes"), which is included in the previously defined list of phrases corresponding to an answer. In other or similar embodiments, text string identifier module 210 can determine that a phrase corresponds to an answer to a question based on a context of the phrase. For example, the phrases provided by participants C, D, and E, included in portion 422 of transcript 420, are not included in the previously defined list of phrases. However, text string identifier module 210 can determine that a context of each phrase provided by C, D, and E (e.g., "yeah," "that's fine," and "okay," respectively) corresponds to a context of the phrase "yes," which is included in the list of previously device phrases. Text string identifier module 210 can identify portions of a transcript including phrases corresponding to answers to a question in accordance with other embodiments. In some embodiments, text string identifier module 210 can identify portions of a transcript where multiple participants of the conference call provided the same, or similar, verbal phrases. For example, text string identifier module 210 can identify portions of a transcript where multiple participants provided a verbal phrase including the word indicating a day of the week.

In response to identifying a portion of a transcript that includes verbal phrases corresponding to answers to a question, text string identifier module 210 can parse portions of the transcript surrounding the identified portion and determine whether a surrounding portion includes a verbal phrase that corresponds to a question. For example, as illustrated in FIG. 4B, text string identifier module 210 can identify the first portion 422 of transcript 420 includes verbal phrases corresponding to an answer to a question. Text string identifier module 210 can parse transcript 420 to identify surrounding portions that include a verbal phrase that corresponds to a question. As illustrated in FIG. 4B, portion 424, which is adjacent to portion 422, includes a question provided by participant A (e.g., "Does everyone agree that we should change our meeting times to Tuesday?"). As such, text string identifier module 210 can identify the text string included in portion 424 of transcript 420 as a text string to be provided to polling question model 220.

Referring back to FIG. 2, in response to identifying one or more text strings, conference management component 122 can provide the identified text strings as input to polling question model 220. In some embodiments, other audio data (e.g., a portion of an audio file) for the conference call can be provided as input to polling question model 220. As described previously, polling question model 220 can receive, as input, one or more text strings including verbal phrases provided by participants of a conference call and provide, as output, a level of confidence associated with the one or more text strings, the level of confidence indicating a likelihood that the one or more text strings includes a question for polling other participants of the conference call. In some embodiments, conference management component 122 can obtain one or more attributes associated with the phrase included in each text string, such as the attributes obtained by attribute component 132 described with respect to FIG. 1. In such embodiments, conference management component 122 can also provide each obtained attribute as input to polling question model 220. In other or similar embodiments, conference management component 122 can provide the audio data received from the client device associated with participant A as input to polling question model 220 in addition to or instead of the identified one or more text strings. For example, conference management component 122 can provide an audio file including an audio recording of the verbal phrase as input to polling question model 220, in accordance with previously described embodiments.

In response to providing the one or more identified text strings (or the audio file including the verbal phrase) as input to polling question model 220, conference management component 122 can receive, as an output, a level of confidence associated with verbal phrase. Conference management component 122 can determine whether the verbal phrase corresponds to a question for polling by determining whether the level of confidence associated with the verbal phrase satisfies a confidence criterion. In some embodiments, conference management component 122 can determine a level of confidence satisfies a confidence criterion in response to determining the level of confidence associated with the verbal phrase meets or exceeds a threshold level of confidence. In response to determining the level of confidence for the verbal phrase satisfies the confidence criterion, conference management component 122 can designate the verbal phrase as a question for polling other participants of the conference call. In response to conference component 122 designating the verbal phrase as a question for polling, conference management component 122 and/or polling engine 151 can store the designated polling question 232 at data store 110.

In some embodiments, polling question model 220 can also provide, as an output, one or more potential responses to the verbal phrase, as previously described. In response to designating the verbal phrase as a polling question, conference management component 122 can designate the one or more potential responses as potential answers to the polling question and can store the potential answers at data store 110.

Figure 3B:
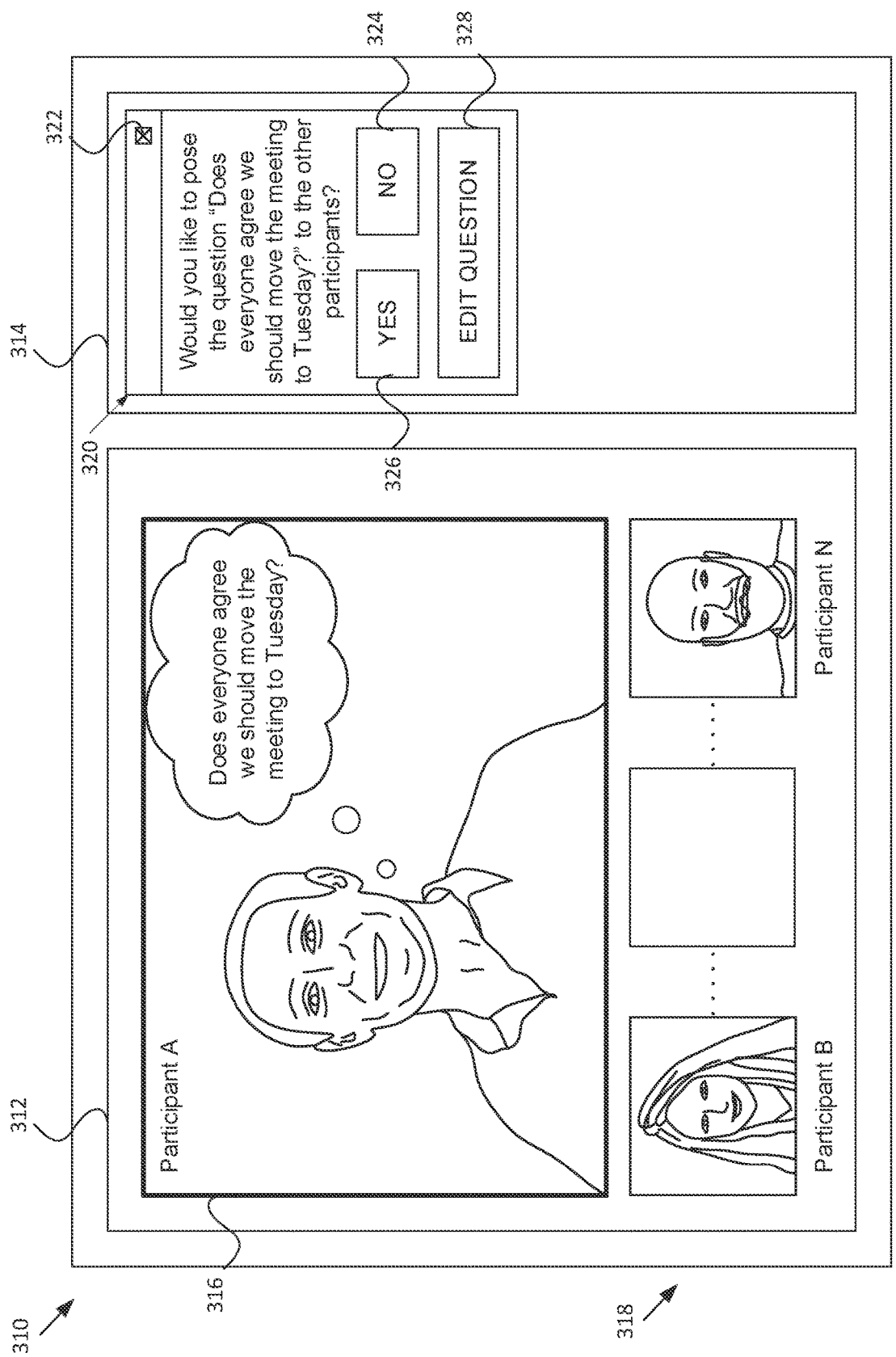
FIGS. 3B-3D illustrate using a verbal phrase recognized as a polling question to poll participants of a conference call, in accordance with implementations of the present disclosure.

As described previously, conference management component 122 can designate a verbal phrase included in one or more text strings as a question for polling during the conference call. In such embodiments, in response to designating a verbal phrase as a question for polling, conference management component 122 can generate and transmit, to a client device associated with the participant that provided the designated verbal phrase, a message inquiring whether the participant would like to pose the question to the other conference call participants. FIG. 3B illustrates a message provided to Participant A after conference management component 122 designates a verbal phrase provided by participant A (e.g., "Does everyone agree we should move the meeting to Tuesday?") as a question for polling. As illustrated, second section 314 of UI 310 can display a message 320 to Participant A inquiring whether Participant A would like to pose the designated question to the other participants (e.g., participants B-N) of the conference call.

In some embodiments, message 320 can include one or more elements to enable Participant A to pose, or not pose, the designated question to the other participants. For example, message 320 can include a first element 322, which enables Participant A to dismiss the message 320. In response to receiving a notification that Participant A interacted with element 322 (e.g., clicked, selected, etc.), the client device associated with Participant A can remove message 320 from the second section 314 of UI 310. In some embodiments, client device can generate and transmit a notification to conference management component 122 indicating that Participant A dismissed message 320. In response to receiving the notification, conference management component 122 can determine that the previously designated question did not correspond to a question for polling participants of the conference call and can provide feedback based on this determination to polling engine 151 and/or training data generator 131 for further training of polling question model 220.

Message 320 can further include a second element 326 configured to enable Participant A to decline posing the question to the other participants of the conference call. In response to receiving a notification that Participant A interacted with element 326, the client device associated with Participant A can generate and transmit a notification to conference management component 122 indicating that Participant A would not like to pose the designated question to the other participants of the conference call. Conference management component 122 can provide feedback to polling engine 151 and/or training data generator 131 in response to receiving the notification, in accordance with previously described embodiments.

Message 320 can further include a third element 326 configured to enable Participant A to pose the question to the other participants of the conference call. In response to receiving a notification that Participant A interacted with element 326, the client device associated with Participant A can generate and transmit a notification to conference management component 122 indicating that Participant A would like to pose the designated question to the other participants. Conference management component 122 can pose the question to the other participants of the call, in accordance with embodiments described with respect to FIG. 3D.

Message 320 can further include a fourth element 328 configured to enable Participant A to edit the designated polling question included in message 320. In response to receiving a notification that Participant A interacted with element 328, the client device associated with Participant A can provide an additional element (not shown) via the second section 314 of UI 310 configured to enable Participant A to edit one or more portions of the designated polling question. For example, the client device can provide a text box in or around the second section 314 of UI 310 to enable Participant A to modify one or more words or phrases included in the designated polling question. In response to receiving a modification to a designated polling question, the client device can generate and transmit a notification to conference management component 122 including the modification to the polling question. Conference management component 122 can provide feedback to polling engine 151 and/or training data generator 131 based on the received notification, in accordance with previously described embodiments.

Figure 3C:
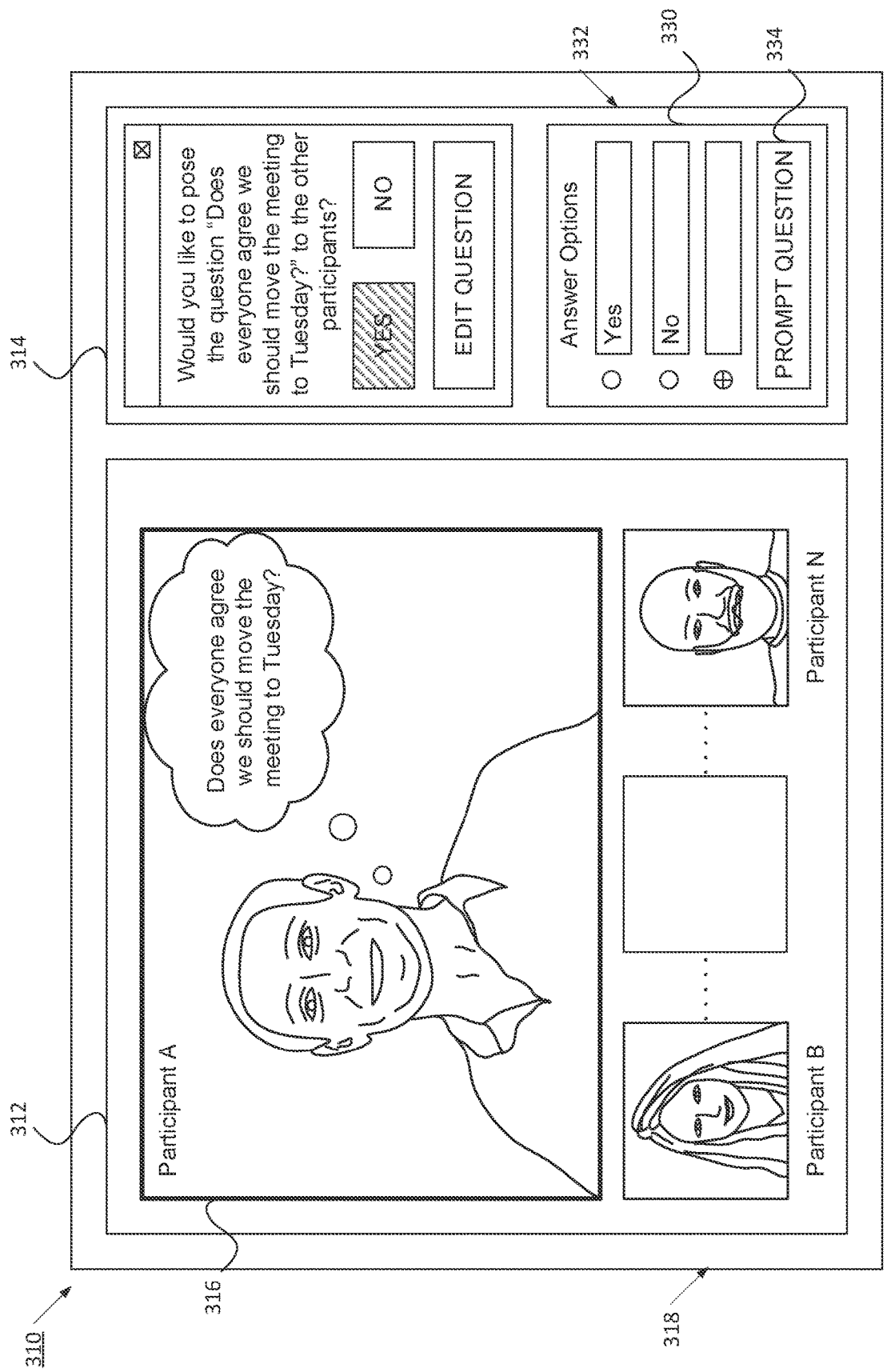

In some embodiments, in response to receiving an indication that Participant A interacted with element 326 (i.e., to indicate he or she would like to pose the designated polling question to the other participants of the conference call), the client device associated with Participant A can modify one or more portions of UI 310 to include an additional message 330. In some embodiments, the additional message 330 can enable a participant to customize one or more settings associated with posing the question to the other participants of the conference call. For example, as illustrated in FIG. 3C, message 330 provides, to Participant A, answer options that can be associated with the question posed to the other participants. As illustrated, message 330 includes one or more first elements 332 configured to enable Participant A to specify one or more answer options associated with the polling question. For example, Participant A can specify that the answer options associated with the polling question "Does everyone agree we should move the meeting to Tuesday?" include "yes" or "no." In some embodiments Participant A can specify the one or more answer options by interacting with the one or more first elements 332 of message 330. For example, Participant A can type or otherwise provide the one or more answer options via the one or more first elements 332 of message 330.

In other or similar embodiments, message 330 can include one or more additional elements (not shown) that enable Participant A to verbally provide the one or more answer options for the polling question. For example, Participant A can interact with (i.e., click) on the one or more additional elements and verbally provide the one or more answer options for the polling question. In response to determining Participant A has interacted with the one or more additional elements, the client device associated with Participant A can generate audio data including one or more verbal phrases provided by Participant A, in accordance with previously described embodiments. In some embodiments, the client device associated with Participant A can convert the audio data to one or more text strings including the verbal phrase. The client device can parse the one or more text strings and identify one or more answers to the question included in the verbal phrase. In response to identifying the one or more answers to the question, the client device associated with Participant A can modify message 330 to include each identified answer provided by Participant A. As described above, the client device can identify the one or more answers to the polling question. In other or similar embodiments, the client device associated with Participant A can transmit a message to conference management component 122 including the audio data. Conference management component 122 can identify the one or more answers to the polling question and transmit the identified answers to the client device associated with Participant A, in accordance with previously described embodiments.

In other or similar embodiments, message 330 can include answer options determined to be associated with the polling question (e.g., by conference management component 122), in accordance with previously described embodiments. It should be noted that, although embodiments of the present disclosure are directed to enabling Participant A to specify one or more answer options associated with the polling question, message 330 can include additional settings associated with the polling question that can be specified by Participant A. For example, message 330 can include an element to enable Participant A to specify particular participants to pose the question to.

Message 330 can include a second element 334 configured to enable Participant A to pose the question to one or more participants of the conference call. In response to receiving an indication that participant A has interacted with element 334, the client device can generate and transmit a notification to conference management component 122 indicating that Participant A would like to pose the question to other participants of the conference call. In some embodiments, the notification can include an indication of any modifications provided to the question and/or an indication of any settings (e.g., answer options) associated with the polling question.

Figure 3D:
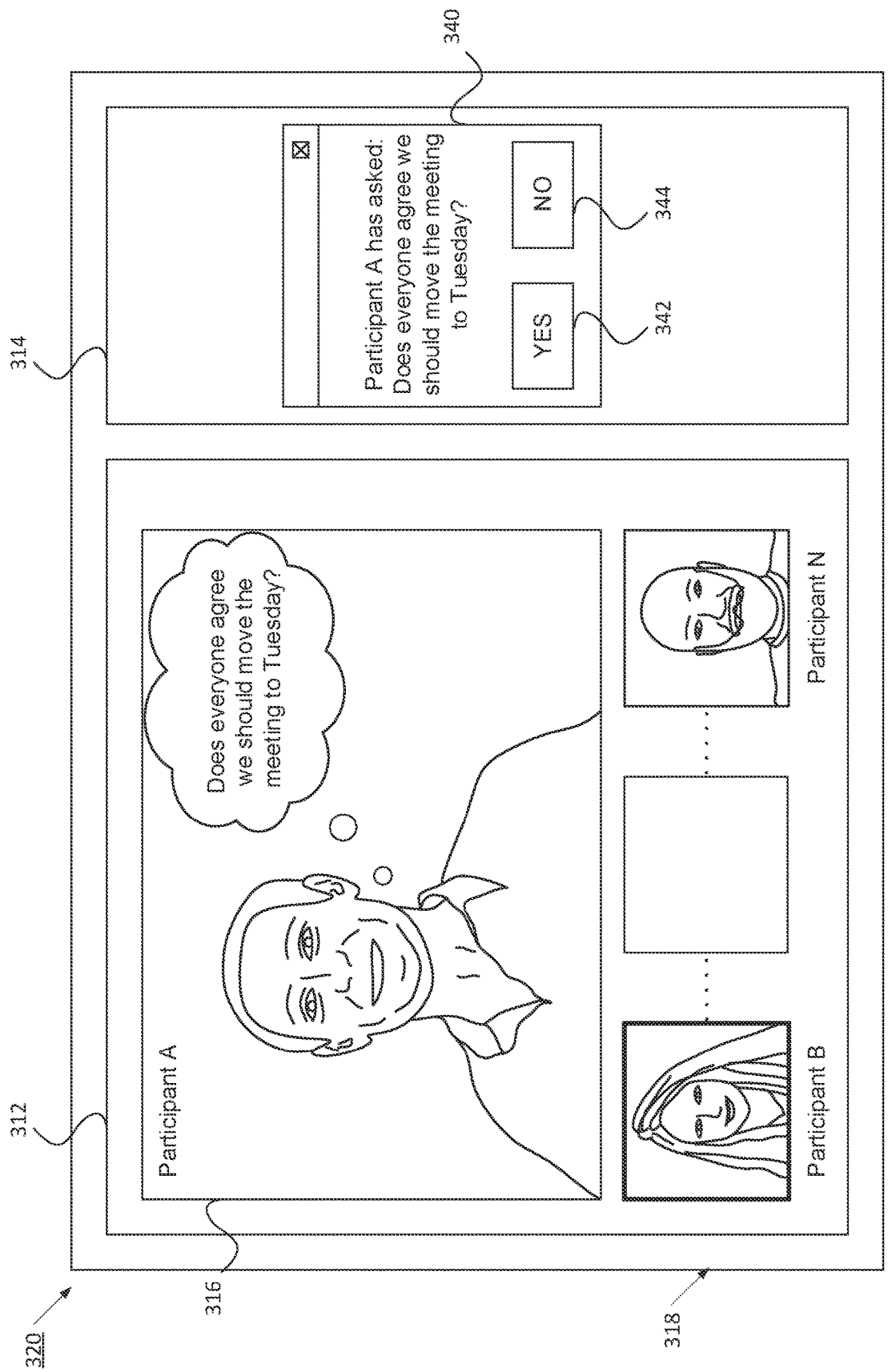

In response to receiving the notification, conference management component 122 can cause a UI on each client device associated with the other participants of the conference call (e.g., Participants B-N) to display a message including the posed question. FIG. 3D illustrates a UI 350 for Participant B of the conference call. As illustrated, the client device associated with Participant B updates section 314 of UI 350 to include a message 340. Message 340 can include one or more UI elements configured to enable Participant B to provide a response to the polling question. In some embodiments, each element of message 340 can correspond to a specified answer option provided by Participant A, in accordance with previously described embodiments. For example, as illustrated in FIG. 3D, message 340 can include a first element 342 associated with a response corresponding to an answer "yes," and a second element 344 associated with a response corresponding to an answer "no." Participant B can provide a response of "yes" or "no" by interacting with a respective element. In other or similar embodiments, message 340 does not include one or more elements associated with a specified answer option provided by Participant B. In such embodiments, message 340 can include one or more elements (not shown) configured to enable Participant B to provide a customized answer to the polling question. For example, message 340 can include a text box configured to enable Participant B type a customized answer to the polling question. In response to detecting that Participant B has provided a response to the polling question (e.g., has interacted with either element 342 or element 344, etc.), the client device associated with Participant B can generate and transmit a notification indicating the response to the polling question provided by Participant B.

Referring back to FIG. 2, in response to receiving the response to the polling question from a participant to the conference call, conference management component 122 can provide the received response to answer collection component 222. Answer collection component 222 can store the received response (i.e., the answer to the polling question) as a collected answer 234 at data store 110. In some embodiments, answer collection component 222 can generate a mapping between the designated polling question and the collected answer 234 and store the matting at data store 110.

During the conference call, polling question model 220 can identify one or more polling questions 232 and answer collection component 222 can collect answers to the polling questions provided by participants of the conference call. During or after the conference call, polling results component 224 can generate results for each polling question stored at data store 110. For example, polling results component 224 can identify each polling question 232 posed during the conference call at data store 110 and each collected answer associated with each polling question 232. Polling results component 224 can analyze each collected answer for each polling question 232 and generate data associated with each polling question 232 based on the analysis. The generated data can be stored as polling results 238 at data store 110. In some embodiments, the generated data can include a number of participants that provided a particular answer to the polling question. In accordance with the previously provided example, polling results component 224 can determine a number of participants that answered "yes" and "no" to the polling question "Does everyone agree we should move the meeting to Tuesday?" In other or similar embodiments, polling results 238 can include data associated with participants that provided particular answers. For example, polling results component 224 can determine that a particular portion of participants that answered "yes" to the polling question are associated with particular characteristics (e.g., identified via a profile associated with each participant).

As described previously, text string identifier module 210 can identify text strings to be provided to polling question module 220 after completion of a conference call (e.g., from transcript 236). Conference management component 122 can provide each identified text string as input to polling question model 220 and receive, as output, a level of confidence indicating a likelihood that the identified text string includes a verbal statement corresponding to a polling question. Conference management component 122 can determine whether the verbal phrase corresponds to a polling question based on the level of confidence, in accordance with previously described embodiments. Referring to FIGS. 4A and 4B, conference management component 122 can determine, based on a level of confidence provided by polling question model 220, that text string 412 (i.e., including the question "Did everybody have a good weekend?") does not include a verbal statement corresponding to a polling question and text string 424 (i.e., including the question "Does everyone agree that we should change our meeting time to Tuesday?") does include a verbal statement corresponding to a polling question. Polling engine 151 can store the question included in text string 424 at data store 110, in accordance with previously described embodiments.

Answer collection component 222 can identify answers corresponding to each designated polling question 232 included in a transcript 236. Answer collection component 222 can identify one or more text strings located within a particular proximity to a text string of transcript 236 including the designated polling question. In some embodiments, the particular proximity can correspond to a distance between a text string including the designated polling question and additional text strings of the transcript, where the distance corresponds to a number of participants of the conference call). Answer collection component 222 can determine whether each identified text string includes a verbal phrase corresponding to an answer to the designated polling question. In response to determining a text string includes a verbal phrase corresponding to an answer to the designated polling question, answer collection component 222 can generate a mapping between the answer and the polling question and store the mapping and/or the answer at data store 110. As illustrated in FIG. 4B, answer collection component 222 can determine each text string located within a particular proximity to text string 424 (i.e., text strings included in portion 422) includes a verbal phrase corresponding an answer to the polling question "Does everyone agree that we should change our meeting time to Tuesday?" As such, answer collection component 222 can generate a mapping between each answer included in a text string and the designated polling question and store the mapping and/or each answer at data store 110.

Polling results component 214 can generate polling results 238 for polling questions and answers identified from transcript 236, in accordance with embodiments described above. In response to polling results component 214 generating polling results 238, conference management component 122 can provide polling results 238 to a client device 102 associated with one or more participants of the conference call. For example, conference management component 122 can provide polling results 238 to client device associated with an organizer of the conference call.

Figure 5:
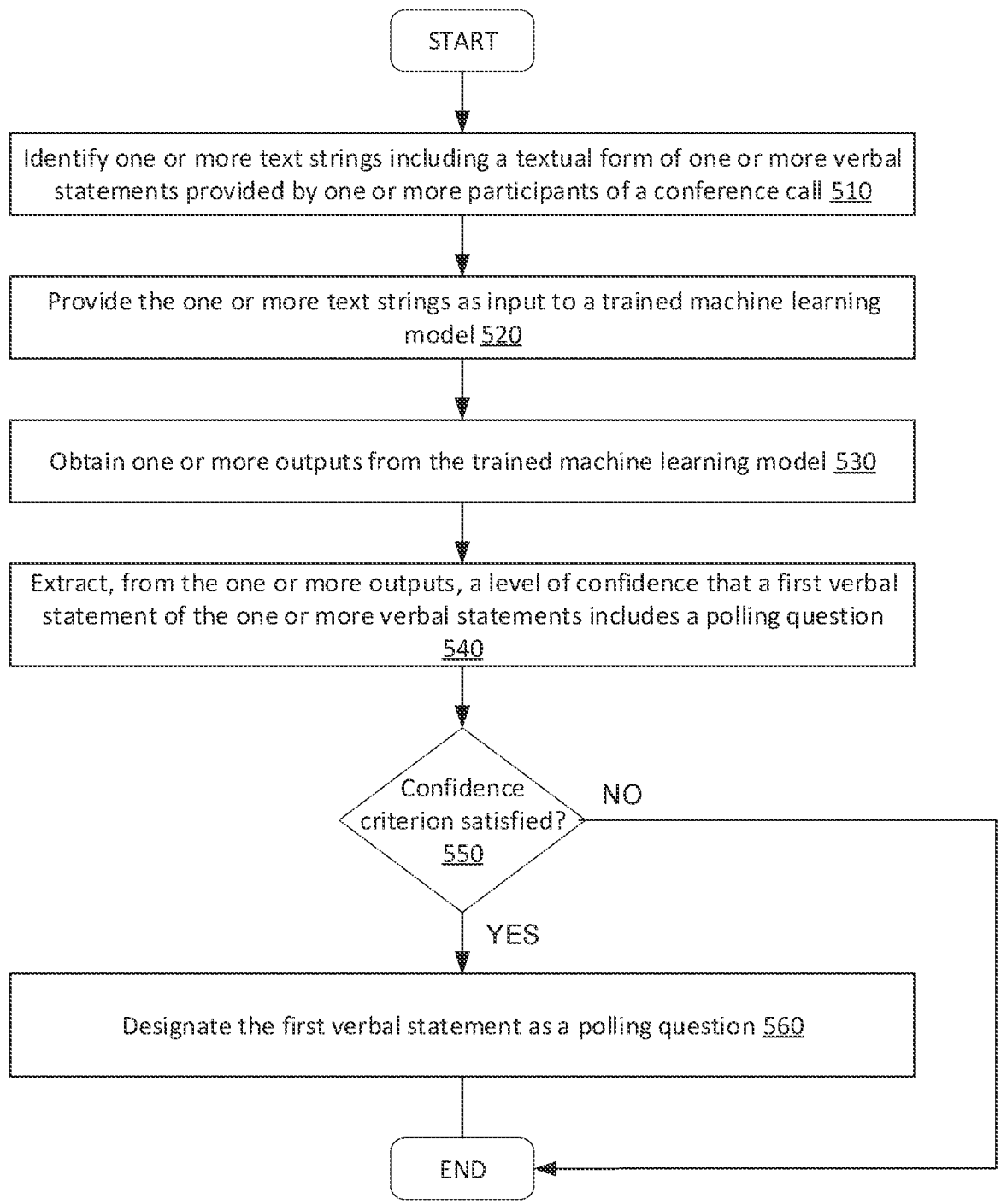
FIG. 5 depicts a flow diagram of a method for designating a verbal phrase provided during a conference call as a polling question, in accordance with implementations of the present disclosure.
Figure 6:
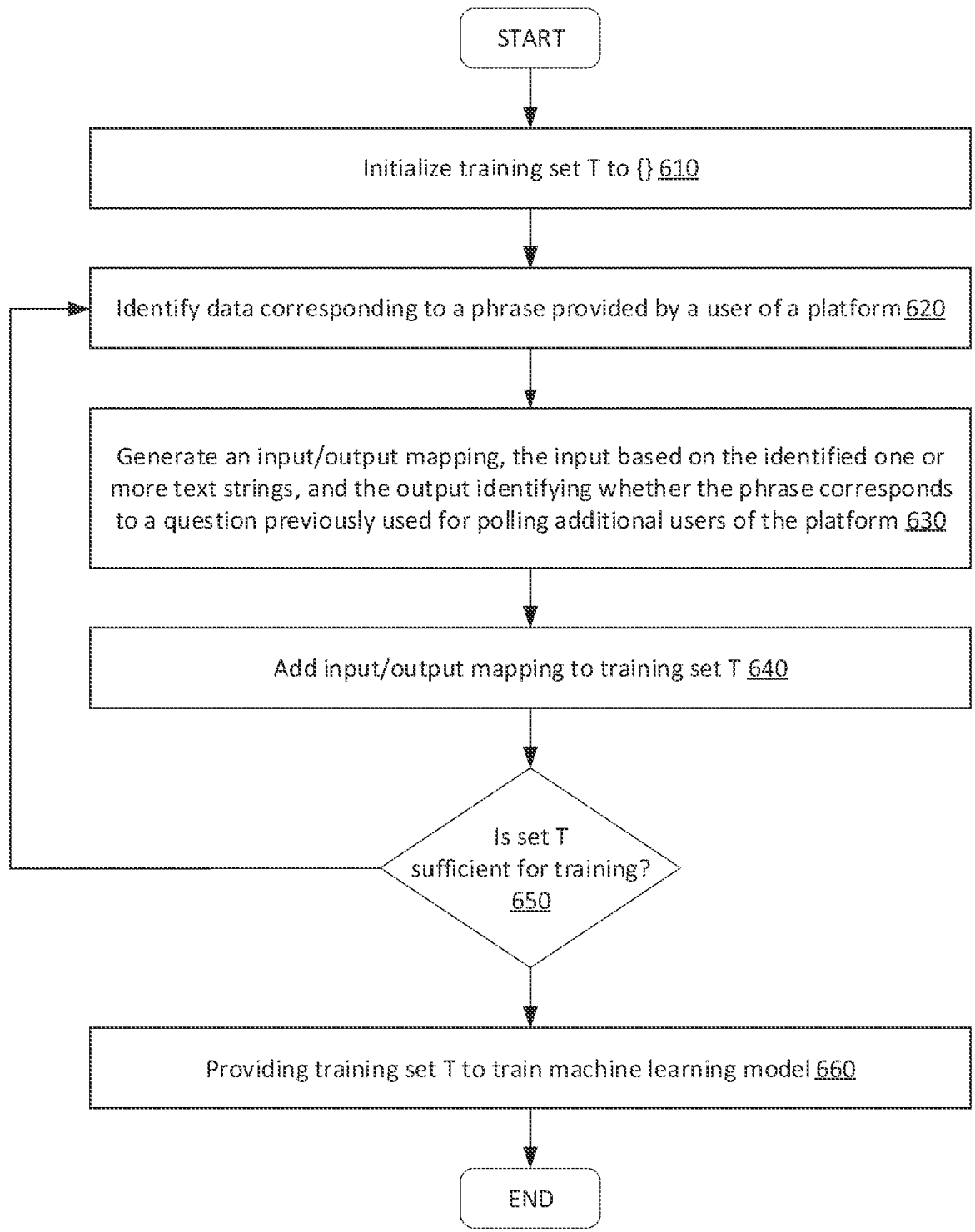
FIG. 6 depicts a flow diagram of a method for training a machine learning model to identify a verbal phrase provided during a conference call that corresponds with a polling question, in accordance with implementations of the present disclosure.

FIG. 5 depicts a flow diagram of a method 500 for designating a verbal phrase provided during a conference call as a polling question, in accordance with implementations of the present disclosure. FIG. 6 depicts a flow diagram of a method 600 for training a machine learning model to identify a verbal phrase provided during a conference call that corresponds with a polling question, in accordance with implementations of the present disclosure. Methods 500 and 600 may be performed by processing logic that may include hardware (circuitry, dedicated logic, etc.), software (e.g., instructions run on a processing device), or a combination thereof. In one implementation, some or all the operations of methods 500 and 600 may be performed by one or more components of system 100 of FIG. 1.

At block 510, the processing logic identifies one or more text strings including a textual form of one or more verbal statements provided by one or more participants of a conference call. The processing logic can identify the one or more text strings by generating, during the conference call, an audio file including the one or more verbal phrases provided by the one or more participants of the conference call. The processing logic can convert content of the audio file into a set of text strings including the one or more text strings. In some embodiments, the processing logic can convert content of the audio file into the set of text strings by generating, during or after completion of the conference call, a transcript of the conference call including the set of text strings. The processing logic can identify the one or more text strings based on the generated transcript. For example, the processing logic can identify a particular text string including a textual form of an additional verbal phrase provided by a participant of the conference call where the additional verbal phrase corresponds to an answer to a potential question. The processing logic can determine that a distance between a text string of the transcript including the verbal phrase and the particular text string including the additional verbal phrase satisfies a distance criterion (e.g., meets or exceeds a distance threshold).

At block 520, the processing logic provides the one or more text strings as input to a trained machine learning model. At block 530, the processing logic obtains one or more outputs from the trained machine learning model. At block 540, the processing logic extracts, from the one or more outputs, a level of confidence that a first verbal statement of the one or more verbal statements includes a polling question. At block 550, the processing logic determines whether a confidence criterion is satisfied. In response to the processing logic determining the confidence criterion is satisfied, method 500 continues to block 560. In response to the processing logic determining the confidence criterion is not satisfied, method 500 terminations. At block 560, the processing logic designates the first verbal statement as a polling question.

In some embodiments, in response to designating the verbal phrase as the polling question presented during the conference call, the processing logic can generate a file including a result of the polling question. A first portion of the file includes the one or more text strings including the verbal phrase and a second portion of the file includes data corresponding to one or more additional verbal phrases associated with answers to the polling question.

In some embodiments, in response to designating the verbal phrase as a polling question presented during the conference call, the processing logic can identify a particular participant that provided the verbal phrase of the one or more verbal phrases. The processing logic can cause the verbal phrase to be displayed in a first UI of a first client device associated with the particular participant. The first UI can include one or more first UI elements configured to enable the particular participant to pose the verbal phrase as the polling question to the one or more additional participants of the conference call. In response to receiving an indication that the particular participant has interacted with the one or more first UI elements of the first UI, the processing logic can cause a notification to be displayed via a second UI of a second client device associated with an additional; participant of the one or more additional participants of the conference call. The notification can include the polling question and one or more second UI elements configured to enable the additional participants to respond to the polling question.

As discussed above, FIG. 6 depicts a flow diagram of a method 600 for training a machine learning model to identify a verbal phrase provided during a conference call that corresponds with a polling question, in accordance with implementations of the present disclosure. At block 610, processing logic initializes a training set T to { }. At block 620, the processing logic identifies data corresponding to a phrase provided by a user of a platform. At block 630, the processing logic generates an input/output mapping, the input based on the identified data and the output identifying whether the phrase corresponds to a question previously used for polling additional users of the platform. At block 640, the processing logic adds the input/output mapping to training set T. At block 650, the processing logic determines whether set T is sufficient for training. In response to processing logic determining set T is sufficient for training, method 600 continues to block 660. In response to the processing logic determining set T is not sufficient for training, method 600 returns to block 620. At block 660, the processing logic provides the training set T to train the machine learning model.

Figure 7:
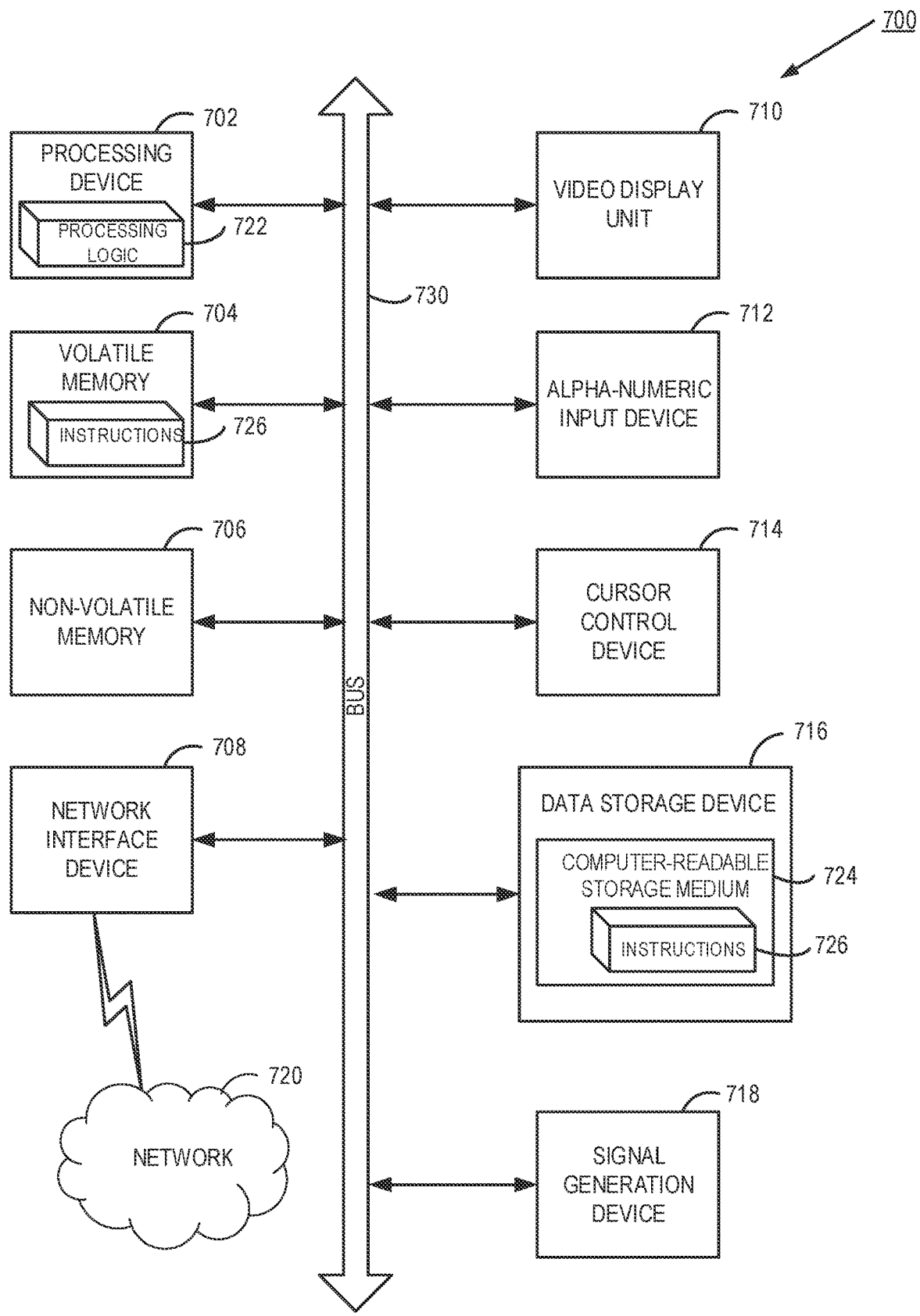
FIG. 7 is a block diagram illustrating an exemplary computer system, in accordance with implementations of the present disclosure.

FIG. 7 is a block diagram illustrating an exemplary computer system, in accordance with implementations of the present disclosure. The computer system 700 can be the server machine 130 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., for predicting channel lineup viewership) for performing the operations discussed herein.

The computer system 700 can further include a network interface device 708. The computer system 800 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also computer-readable storage medium) on which is stored one or more sets of instructions 705 (e.g., for predicting channel lineup viewership) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for designating a verbal statement as a polling question. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:
   obtaining one or more audio files comprising verbal phrases provided by a plurality of participants of a conference call;
   converting content of the one or more audio files into a set of text strings comprising a textual form of the verbal phrases;
   providing the set of text strings as input to a machine learning model, wherein the machine learning model is trained to predict, based on given textual data, a verbal phrase indicated by text strings of the textual data that comprises one or more questions for polling conference call participants;
   obtaining one or more outputs from the machine learning model;
   extracting, from the one or more outputs, a level of confidence that a verbal phrase provided by a first participant of the plurality of participants comprises a question associated with polling other participants during the conference call;
   responsive to determining that the level of confidence satisfies a confidence criterion, designating the verbal phrase as a polling question presented during the conference call; and
   causing the verbal phrase to be displayed in a user interface (UI) of a first client device associated with the first participant of the conference call, wherein the UI of the first client device comprises one or more UI elements configured to enable the first participant to pose the verbal phrase as the polling question to one or more additional participants of the conference call, and to edit at least a portion of the polling question.

2. The method of claim 1, wherein converting the content of the audio file into the set of text strings comprises:
generating a transcript of the conference call comprising the set of text strings, wherein the one or more text strings are identified based on the generated transcript.

3. The method of claim 2, further comprising:
identifying, in the transcript, a particular text string comprising a textual form of an additional verbal phrase provided by a participant of the conference call, the additional verbal phrase corresponding to an answer to a potential question; and
determining that a distance between a text string of the transcript comprising the verbal phrase and the particular text string comprising the additional verbal phrase satisfies a distance criterion.

4. The method of claim 2, further comprising:
responsive to designating the verbal phrase as the polling question presented during the conference call, generating a file comprising a result of the polling question, wherein a portion of the file comprises the one or more text strings comprising the verbal phrase, and wherein an additional portion of the file comprises data corresponding to one or more additional verbal phrases associated with answers to the polling question.

5. The method of claim 1, further comprising:
identifying, among the plurality of participants of the conference call, the first participant that provided the verbal phrase.

6. The method of claim 5, further comprising:
responsive to receiving an indication that the first participant has interacted with the one or more UI elements of the UI of the first client device, causing a notification to be displayed via a UI of an additional client device associated with an additional participant of the one or more additional participants of the conference call, the notification comprising the polling question and one or more additional UI elements configured to enable the additional participant to respond to the polling question.

7. A non-transitory computer readable storage medium comprising instructions for a server that, when executed by a processing device, cause the processing device to perform operations comprising:
obtaining one or more audio files comprising verbal phrases provided by a plurality of participants of a conference call;
converting content of the one or more audio files into a set of text strings comprising a textual form of the verbal phrases;
providing the set of text strings as input to a machine learning model, wherein the machine learning model is trained to predict, based on given textual data, a verbal phrase indicated by text strings of the textual data that comprises one or more questions for polling conference call participants;
obtaining one or more outputs from the machine learning model;
extracting, from the one or more outputs, a level of confidence that a verbal phrase provided by a first participant of the plurality of participants comprises a question associated with polling other participants during the conference call;
responsive to determining that the level of confidence satisfies a confidence criterion, designating the verbal phrase as a polling question presented during the conference call; and
causing the verbal phrase to be displayed in a user interface (UI) of a first client device associated with the first participant of the conference call, wherein the UI of the first client device comprises one or more UI elements configured to enable the first participant to pose the verbal phrase as the polling question to one or more additional participants of the conference call, and to edit at least a portion of the polling question.

8. The non-transitory computer readable storage medium of claim 7, wherein to convert the content of the audio file into the set of text strings, the processing device is to perform operations comprising:
generating a transcript of the conference call comprising the set of text strings, wherein the one or more text strings are identified based on the generated transcript.

9. The non-transitory computer readable storage medium of claim 8, wherein, the processing device is to perform operations further comprising:
identifying, in the transcript, a particular text string comprising a textual form of an additional verbal phrase provided by a participant of the conference call, the additional verbal phrase corresponding to an answer to a potential question; and
determining that a distance between a text string of the transcript comprising the verbal phrase and the particular text string comprising the additional verbal phrase satisfies a distance criterion.

10. The non-transitory computer readable storage medium of claim 8, wherein the processing device is to perform operations further comprising:
responsive to designating the verbal phrase as the polling question presented during the conference call, generating a file comprising a result of the polling question, wherein a portion of the file comprises the one or more text strings comprising the verbal phrase and wherein an additional portion of the file comprises data corresponding to one or more additional verbal phrases associated with answers to the polling question.

11. The non-transitory computer readable storage medium of claim 7, wherein the processing device is to perform operations further comprising:
identifying, among the plurality of participants of the conference call, the first participant that provided the verbal phrase.

12. The non-transitory computer readable storage medium of claim 11, wherein the processing device is to perform operations further comprising:
responsive to receiving an indication that the first participant has interacted with the one or more UI elements of the UI of the first client device, causing a notification to be displayed via a UI of an additional client device associated with an additional participant of the one or more additional participants of the conference call, the notification comprising the polling question and one or more additional UI elements configured to enable the additional participant to respond to the polling question.

13. The method of claim 1, further comprising:
identifying one or more answers to the designated polling question based on at least one of the set of text strings associated with the obtained one or more audio files or one or more additional audio files comprising additional verbal phrases provided by at least a portion of the plurality of participants.

14. The method of claim 13, wherein the verbal phrase is designated as the polling question and the one or more answers to the designated polling question are identified during the conference call.

15. A system comprising:
a memory device; and
a processing device coupled to the memory device, the processing device to perform operations comprising:
obtaining one or more audio files comprising verbal phrases provided by a plurality of participants of a conference call;
converting content of the one or more audio files into a set of text strings comprising a textual form of the verbal phrases;
providing the set of text strings as input to a machine learning model, wherein the machine learning model is trained to predict, based on given textual data, a verbal phrase indicated by text strings of the textual data that comprises one or more questions for polling conference call participants;
obtaining one or more outputs from the machine learning model;
extracting, from the one or more outputs, a level of confidence that a verbal phrase provided by a first participant of the plurality of participants comprises a question associated with polling other participants during the conference call;
responsive to determining that the level of confidence satisfies a confidence criterion, designating the verbal phrase as a polling question presented during the conference call; and
causing the verbal phrase to be displayed in a user interface (UI) of a first client device associated with the first participant of the conference call, wherein the UI of the first client device comprises one or more UI elements configured to enable the first participant to pose the verbal phrase as the polling question to one or more additional participants of the conference call, and to edit at least a portion of the polling question.

16. The system of claim 15, wherein converting the content of the audio file into the set of text strings comprises:
generating a transcript of the conference call comprising the set of text strings, wherein the one or more text strings are identified based on the generated transcript.

17. The system of claim 16, the operations further comprising:
identifying, in the transcript, a particular text string comprising a textual form of an additional verbal phrase provided by a participant of the conference call, the additional verbal phrase corresponding to an answer to a potential question; and
determining that a distance between a text string of the transcript comprising the verbal phrase and the particular text string comprising the additional verbal phrase satisfies a distance criterion.

18. The system of claim 16, the operations further comprising:
responsive to designating the verbal phrase as the polling question presented during the conference call, generating a file comprising a result of the polling question, wherein a portion of the file comprises the one or more text strings comprising the verbal phrase, and wherein an additional portion of the file comprises data corresponding to one or more additional verbal phrases associated with answers to the polling question.

19. The system of claim 16, the operations further comprising:
identifying, among the plurality of participants of the conference call, the first participant that provided the verbal phrase.

20. The system of claim 19, the operations further comprising:
responsive to receiving an indication that the first participant has interacted with the one or more UI elements of the UI of the first client device, causing a notification to be displayed via a UI of an additional client device associated with an additional participant of the one or more additional participants of the conference call, the notification comprising the polling question and one or more additional UI elements configured to enable the additional participant to respond to the polling question.

* * * * *